US010042152B2

(12) United States Patent
Yamawaki

(10) Patent No.: US 10,042,152 B2
(45) Date of Patent: Aug. 7, 2018

(54) IMMERSION MICROSCOPE OBJECTIVE AND MICROSCOPE USING THE SAME

(71) Applicant: OLYMPUS CORPORATION, Shibuya-ku, Tokyo (JP)

(72) Inventor: Yasuhiro Yamawaki, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 289 days.

(21) Appl. No.: 14/504,112

(22) Filed: Oct. 1, 2014

(65) Prior Publication Data
US 2015/0146304 A1    May 28, 2015

(30) Foreign Application Priority Data
Nov. 26, 2013 (JP) .................................. 2013-244336

(51) Int. Cl.
*G02B 21/33* (2006.01)
*G02B 21/02* (2006.01)
(Continued)

(52) U.S. Cl.
CPC ......... *G02B 21/33* (2013.01); *G02B 21/0076* (2013.01); *G02B 21/02* (2013.01); *G02B 21/32* (2013.01); *G02B 27/0068* (2013.01)

(58) Field of Classification Search
CPC .... G02B 21/33; G02B 21/0076; G02B 21/02; G02B 27/0068
(Continued)

(56) References Cited

U.S. PATENT DOCUMENTS 5,659,425 A * 8/1997 Suzuki ............... G02B 21/02
359/656
7,486,445 B2 2/2009 Konishi et al.
(Continued)

FOREIGN PATENT DOCUMENTS

EP    2453286 A1    5/2012
JP    07281097 A    10/1995
(Continued)

OTHER PUBLICATIONS

Extended European Search Report (EESR) dated Mar. 31, 2015 issued in counterpart European Application No. 14187726.6.
(Continued)

*Primary Examiner* — Darryl J Collins
*Assistant Examiner* — Gary O'Neill
(74) *Attorney, Agent, or Firm* — Holtz, Holtz & Volek PC

(57) ABSTRACT

An immersion microscope objective includes a first lens group having a positive refractive power, a second lens group having a positive refractive power, and a third lens group having a negative refractive power. The first lens group includes a first lens surface and a second lens surface. The first lens surface is positioned nearest to the object side, and the second lens surface is positioned on an image side of the first lens surface and nearest to the first lens surface. The conditional expression $-3 \leq (r_{G12}/f) \times (NA_{ob}/nd_{imm})^2 \leq -1.7$ is satisfied, in which $r_{G12}$ denotes a radius of curvature at the second lens surface, f denotes a focal length of an entire system of the immersion microscope objective, $NA_{ob}$ denotes an object-side numerical aperture of the immersion microscope objective, and $nd_{imm}$ denotes a refractive index of an immersion liquid for a d-line.

12 Claims, 8 Drawing Sheets

(51) Int. Cl.
*G02B 21/32* (2006.01)
*G02B 27/00* (2006.01)
*G02B 21/00* (2006.01)

(58) Field of Classification Search
USPC ............... 359/656, 657, 658, 659, 660, 661
See application file for complete search history.

(56) References Cited

U.S. PATENT DOCUMENTS

| | | | |
|---|---|---|---|
| 7,642,525 B2 | 1/2010 | Konishi et al. | |
| 2003/0076600 A1* | 4/2003 | Watanabe | G02B 21/02 359/656 |
| 2006/0203354 A1* | 9/2006 | Fujimoto | G02B 21/02 359/660 |
| 2007/0091454 A1 | 4/2007 | Wartmann | |
| 2009/0032732 A1* | 2/2009 | Konishi | G02B 21/0064 250/458.1 |
| 2012/0113524 A1* | 5/2012 | Kasahara | G02B 21/33 359/656 |
| 2015/0146304 A1 | 5/2015 | Yamawaki | |

FOREIGN PATENT DOCUMENTS

| | | |
|---|---|---|
| JP | 2003121750 A | 4/2003 |
| JP | 2004061589 A | 2/2004 |
| JP | 2006195125 A | 7/2006 |
| JP | 4082015 B2 | 4/2008 |
| JP | 2008170969 A | 7/2008 |
| JP | 2011145713 A | 7/2011 |
| JP | 2012118509 A | 6/2012 |
| JP | 2015102758 A | 6/2015 |

OTHER PUBLICATIONS

Japanese Office Action (and English translation thereof) dated Apr. 26, 2017, issued in counterpart Japanese Application No. 2013-244336.

Japanese Office Action dated May 30, 2018 issued in counterpart Japanese Application No. 2017-144194.

* cited by examiner

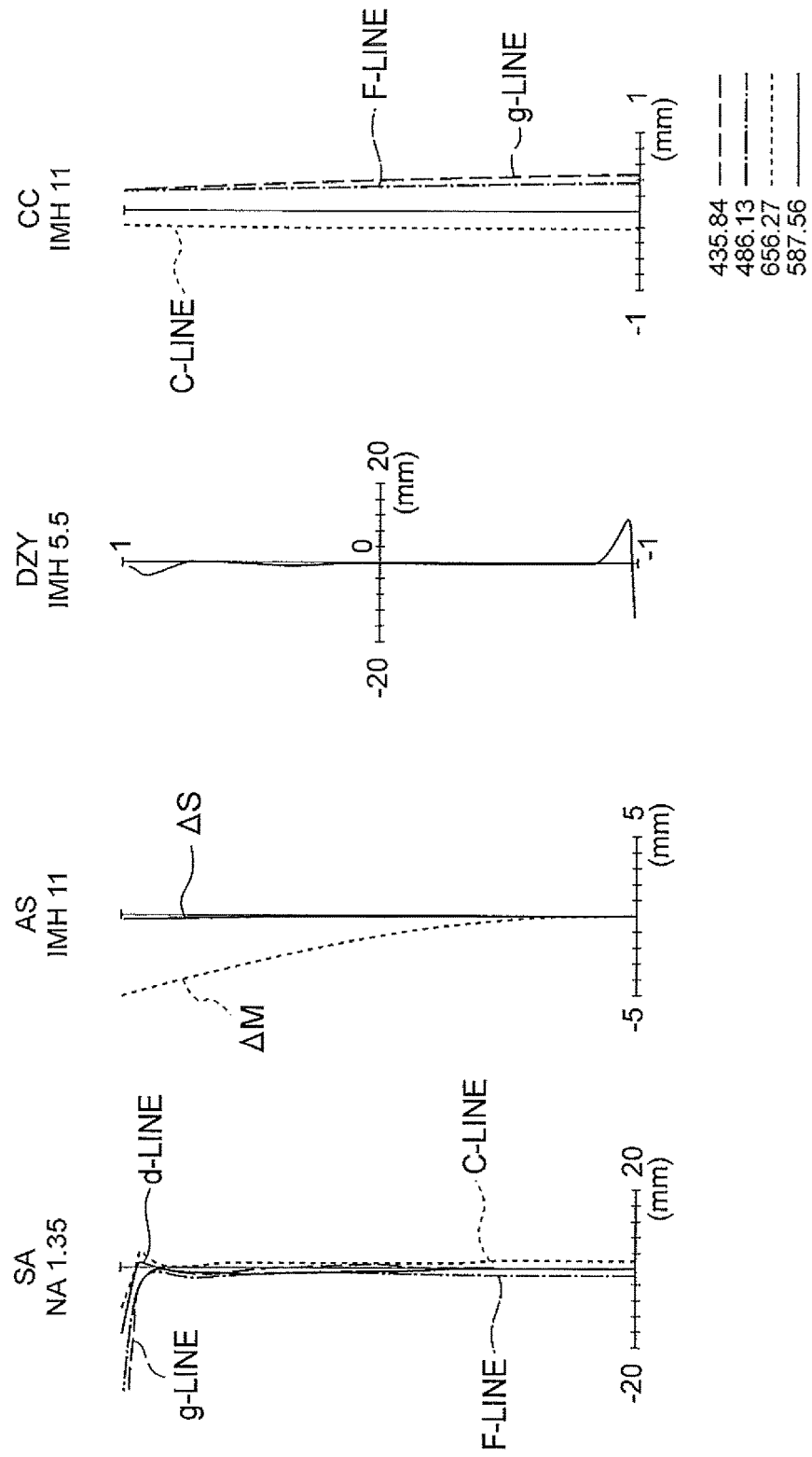

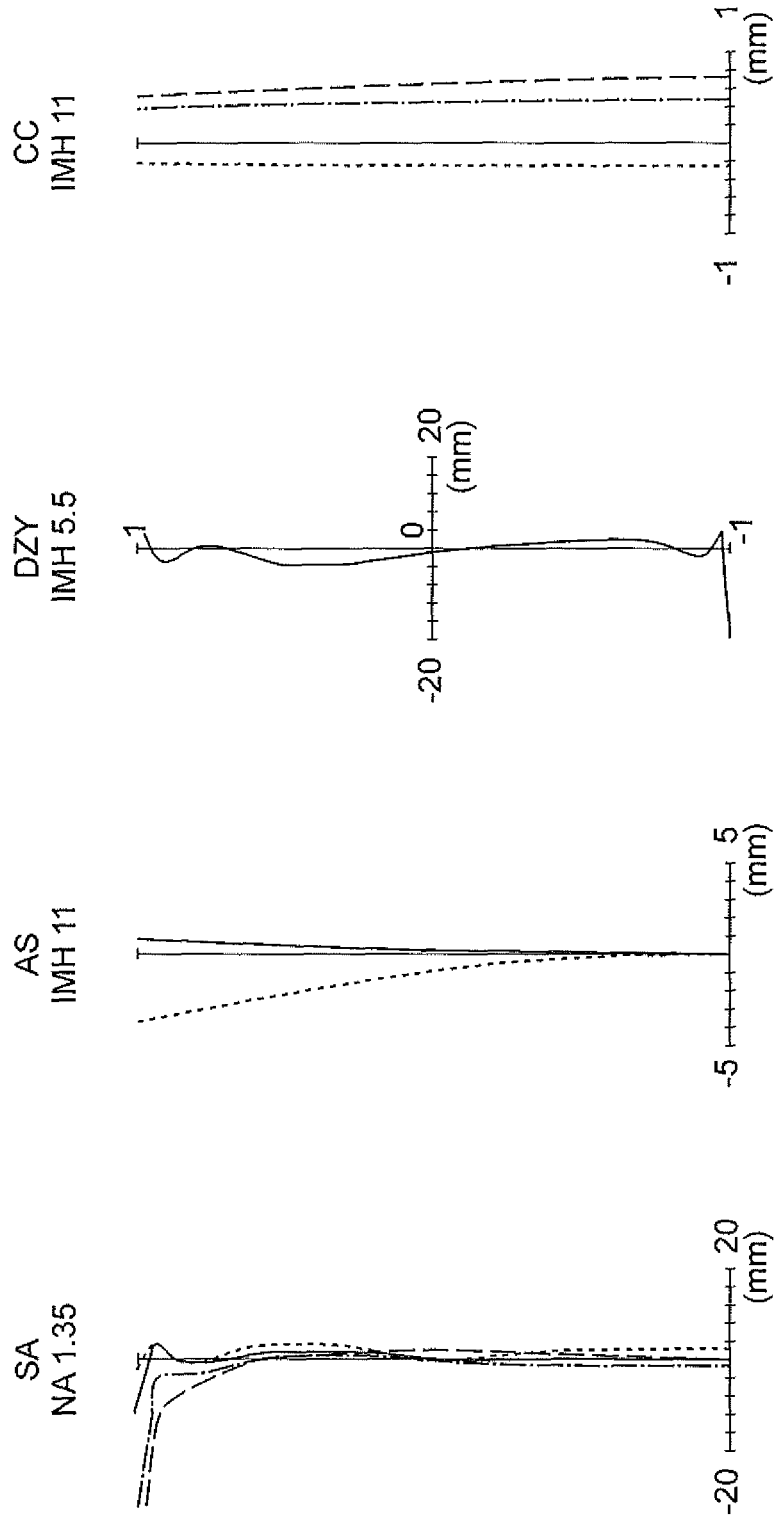

IMMERSION MICROSCOPE OBJECTIVE AND MICROSCOPE USING THE SAME

CROSS-REFERENCE TO RELATED APPLICATION

The present application is based upon and claims the benefit of priority from the prior Japanese Patent Application No. 2013-244336 filed on Nov. 26, 2013; the entire contents of which are incorporated herein by reference.

BACKGROUND OF THE INVENTION

Field of the Invention

The present invention relates to an immersion microscope objective, and a microscope using the same.

Description of the Related Art

Recently, in research in biology and genetics, there is a desire and demand to perform fluorescence observation on a thick and live biological specimen with high resolving power. To meet this demand, a microscope objective is required to have a large numerical aperture (high NA) and high magnification.

The microscope objective of this kind is often used in a confocal laser scanning microscope. A confocal laser scanning microscope has a very small depth of focus, so it can obtain a sectioning image of a specimen. In order to obtain an accurate sectioning image, the microscope objective is required to have high flatness of a field.

An immersion microscope objective is the microscope objective that can satisfy such requirements. In an immersion microscope objective, there is an immersion liquid between the immersion microscope objective and a specimen. Thus, when the immersion microscope objective is used to observe a deep portion of a biological specimen, spherical aberration may occur, depending on the type of the immersion liquid used, because of the difference between the refractive index (1.33 to 1.45) of the biological specimen and the refractive index of the immersion liquid. In order to reduce such spherical aberration, it is desirable that the biological specimen and the immersion liquid have similar refractive indices.

Specifically, as an immersion liquid, the following are desirable: water (refractive index: 1.33), culture solution (refractive index: 1.33), silicone oil (refractive index: 1.40), and a mixture of glycerin and water (refractive index: 1.33 to 1.47). Further, it is preferable that an immersion microscope objective also has its aberrations favorably corrected for these immersion liquids.

Furthermore, the spherical aberration varies depending on the position being observed (i.e. the depth from the surface of the biological specimen). Therefore, it is desirable that the immersion microscope objective is provided with a correction collar, which enables correction of the spherical aberration.

As an immersion microscope objective having a large numerical aperture, an immersion microscope objective disclosed in Japanese Patent Application Laid-Open No. 2008-170969 is available. In the immersion microscope objective disclosed in Japanese Patent Application Laid-Open No. 2008-170969, the magnification and numerical aperture are 60× and 1.4, respectively, in the case of an oil immersion microscope objective, and 60× and 1.3, respectively, in the case of a silicone immersion microscope objective.

SUMMARY OF THE INVENTION

An immersion microscope objective according to the present invention comprising, in order from an object side: a first lens group having a positive refractive power; a second lens group having a positive refractive power; and a third lens group having a negative refractive power; wherein the first lens group includes a first lens surface and a second lens surface, the first lens surface is positioned nearest to the object side, and the second lens surface is positioned on an image side of the first lens surface and nearest to the first lens surface, and the following conditional expression (1) is satisfied:

$$-3 \leq (r_{G12}/f) \times (NA_{ob}/nd_{imm})^2 \leq -1.7 \quad (1)$$

where $r_{G12}$ denotes a radius of curvature at the second lens surface, f denotes a focal length of an entire system of the immersion microscope objective, $NA_{ob}$ denotes an object-side numerical aperture of the immersion microscope objective, and $nd_{imm}$ denotes a refractive index of an immersion liquid for a d-line.

A microscope according to the present invention comprising:

a light source; an illumination optical system; a main-body section; an observation optical system; and a microscope objective, wherein the immersion microscope objective described above is used for the microscope objective.

BRIEF DESCRIPTION OF THE DRAWINGS

FIGS. 4A, 4B, 4C, and 4D are aberration diagrams of the immersion microscope objective according to the example 1;

FIGS. 6A, 6B, 6C, and 6D are aberration diagrams of the immersion microscope objective according to the example 3;

DETAILED DESCRIPTION OF THE INVENTION

Figure 1:
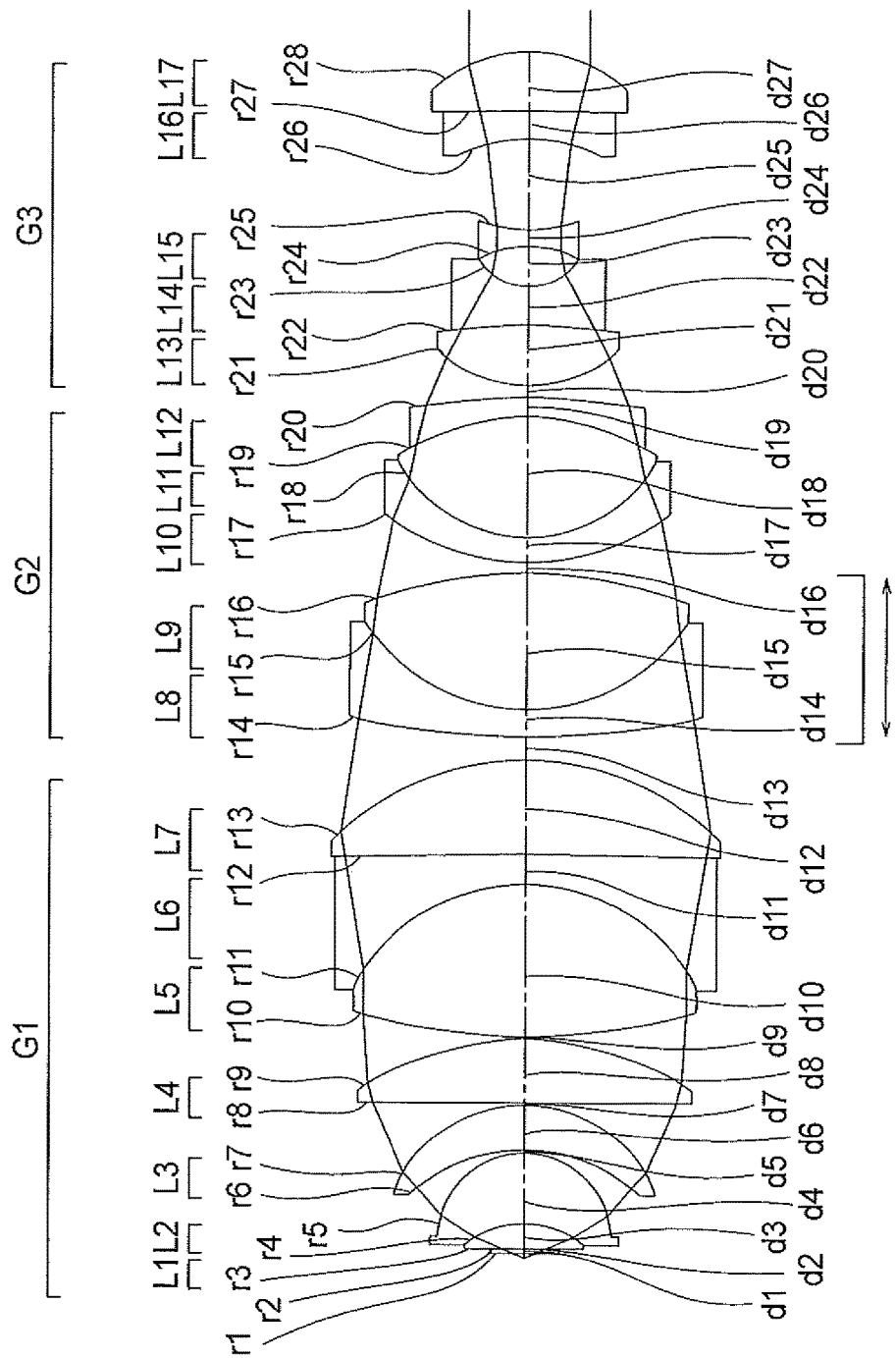
FIG. 1 is a cross-sectional view along an optical axis, showing an optical arrangement of an immersion microscope objective according to an example 1 of the present invention.

An immersion microscope objective according to an embodiment comprises, in order from an object side: a first lens group having a positive refractive power; a second lens group having a positive refractive power; and a third lens group having a negative refractive power; wherein the first lens group includes a first lens surface and a second lens surface, the first lens surface is positioned nearest to the object side and the second lens surface is positioned on an image side of the first lens surface and nearest to the first lens surface, and the following conditional expression (1) is satisfied:

$$-3 \leq (r_{G12}/f) \times (NA_{ob}/nd_{imm})^2 \leq -1.7 \quad (1)$$

where $r_{G12}$ denotes a radius of curvature at the second lens surface, f denotes a focal length of an entire system of the immersion microscope objective, $NA_{ob}$ denotes an object-side numerical aperture of the immersion microscope objective, and $nd_{imm}$ denotes a refractive index of an immersion liquid for a d-line.

The immersion microscope objective (hereinafter, referred to as the "objective" as appropriate) according to the present embodiment is an immersion microscope objective which is used together with an immersion liquid whose refractive index for the d-line is $nd_{imm}$. The objective according to the present embodiment includes, in order from the object side, the first lens group having a positive refractive power, the second lens group having a positive refractive power, and the third lens group having a negative refractive power. The object side means a sample side.

If an object-side numerical aperture (hereinafter, simply referred to as the "numerical aperture") of the objective is made large, it is possible to make light with a larger angle of divergence (diffraction angle) incident on the objective from the sample. As a result, it is possible to observe a microscopic structure of the sample further minutely. Light with a large angle of divergence, however, has a high light-ray height in the first lens group. When such a light ray is bent sharply in the first lens group, high order aberration is liable to occur in the first lens group.

In the objective according to the present embodiment, the first lens group is configured to have a positive refractive power, to thereby cause the light ray with a large angle of divergence to be bent gradually through the first lens group. This can suppress the occurrence of large high order aberration.

Further, the second lens group is also configured to have a positive refractive power. In the first lens group, as explained above, the light ray with a large angle of divergence is bent gradually. This means that the diameter of the light beam exiting the first lens group has not become sufficiently small. Therefore, in the second lens group, the light beam diameter is made to decrease gradually.

The third lens group is configured to have a negative refractive power. In the second lens group, a divergent light beam has been changed to a convergent light beam. Therefore, in the position of the third lens group, the light-ray height is low. Accordingly, with the negative refractive power of the third lens group, the Petzval's sum can be made small. Further, the convergent light beam from the second lens group is changed to a substantially parallel light beam by the third lens group.

Further, in the objective according to the present embodiment, the conditional expression (1) is satisfied.

When the conditional expression (1) is satisfied, the radius of curvature of the second lens surface attains the radius of curvature that can suppress the divergence of light ray and the occurrence of aberration in a well-balanced manner. As a result, it is possible to increase the object-side numerical aperture, while suppressing the occurrence of aberration. It should be noted that the second lens surface is preferably a cemented surface, although it may be either an air-contact surface or a cemented surface.

When falling below the lower limit of the conditional expression (1), the radius of curvature of the second lens surface will become excessively large. In this case, since the angle of incidence of the light ray incident on the second lens surface will become large, a large spherical aberration will occur. Further, when the second lens surface is a cemented surface, a large chromatic aberration will occur.

When exceeding the upper limit of the conditional expression (1), the radius of curvature of the second lens surface will become excessively small. In this case, the negative refractive power at the second lens surface will become large, and the light-ray height of the axial light beam after it has passed through the second lens surface will become high. This leads to occurrence of high order spherical aberration, but it will be difficult to correct such high order spherical aberration with the optical system that is located closer to the image side than the second lens surface. Further, the radius of curvature will be small, leading to a decreased effective aperture of the second lens surface, making it impossible to increase the object-side numerical aperture.

In the immersion microscope objective according to the present embodiment, it is preferable that the first lens group converts a divergent light beam to a convergent light beam, the third lens group includes an object-side lens component and an image-side lens component, the object-side lens component is disposed nearest to the object side and the image-side lens component is disposed closer to the image side than the object-side lens component, the object-side lens component has a meniscus shape with a concave surface facing the image side, the image-side lens component has a meniscus shape with a concave surface facing the object side, and that the lens component is a single lens or a cemented lens.

If the divergent light beam cannot be converted to a convergent light beam in the first lens group, the height of the light ray passing through the second lens group will become high. In such a case, high order spherical aberration is liable to occur in the second lens group. Thus, in the first lens group, the light ray with a large angle of divergence is gradually bent, and also, the divergent light beam is converted to a convergent light beam. In this manner, the spherical aberration is favorably corrected in the first lens group, and the occurrence of high order spherical aberration in the second lens group is also prevented.

Further, in the third lens group, the object-side lens component is disposed with its concave surface facing the image side, and the image-side lens component is disposed with its concave surface facing the object side. As such, in the third lens group, the two lens components are disposed such that their concave surfaces face each other, so the third lens group has a so-called Gauss-type lens arrangement. This allows an appropriate negative Petzval's sum to be obtained in the third lens group.

In an objective having a large numerical aperture, a cemented lens is disposed in a lens group arranged near the object, generally in the first lens group. In the cemented lens, two lenses are cemented together in the state where the object-side lens is embedded in the image-side lens. Although it may be possible to obtain a negative Petzval's sum at the cemented surfaces of the object-side lens (embedded lens) and the image-side lens, the negative Petzval's sum thus obtained tends to be insufficient.

Thus, a lens group having a concave surface is disposed closer to the image side than the first lens group. It is necessary to correct the Petzval's sum by compensating for the insufficient negative Petzval's sum by that concave surface. In the case where a lens of a meniscus shape is disposed in the lens group having the concave surface, a single meniscus-shaped lens alone cannot sufficiently correct the Petzval's sum. Thus, two meniscus-shaped lenses are used and disposed such that their concave surfaces face each other. This configuration can secure a sufficient negative Petzval's sum, and accordingly, the Petzval's sum can be corrected.

Further, with the meniscus-shaped lens disposed such that its concave surface faces the object side, it is possible to optimally adjust the light-ray height or angle of the light ray that emerges from the objective.

It should be noted that the meniscus-shaped lens is preferably a cemented lens. This configuration can favorably correct longitudinal chromatic aberration as well as chromatic aberration of magnification.

Further, in the immersion microscope objective according to the present embodiment, it is preferable that the first lens group includes a first cemented lens disposed nearest to the object side, the first cemented lens includes an object-side lens and an image-side lens, and the following conditional expression (2) is satisfied:

$$0.3 \leq nd_{G1i} - nd_{G1o} \leq 0.5 \quad (2)$$

where $nd_{G1i}$ denotes a refractive index of the image-side lens for the d-line, and $nd_{G1o}$ denotes a refractive index of the object-side lens for the d-line.

When the conditional expression (2) is satisfied, it is possible to make a divergent light beam with a large angle of divergence incident on the objective, and it is also possible to convert the incident divergent light beam with a large angle of divergence to a convergent light beam with ease.

Here, as the refractive index of the object-side lens and the refractive index of the immersion liquid are made close to each other, it is possible to make a divergent light beam having a large angle of divergence incident on the objective, while suppressing the occurrence of aberration at the boundary between the immersion liquid and the object-side lens surface. On the other hand, the refractive index of the image-side lens is appropriately larger than the refractive index of the object-side lens. Accordingly, the incident divergent light beam with a large angle of divergence can be bent to approach the optical axis.

When exceeding the upper limit of the conditional expression (2), the refractive index of the image-side lens will become excessively large. In this case, since the sensitivity (rate of change) of spherical aberration to the lens thickness tolerance will become large, occurrence of aberration caused by manufacturing errors will become large. Further, in a glass material having a large refractive index, a transmittance of ultraviolet light is low. Therefore, in fluorescence observation using ultraviolet light, it will become difficult to illuminate a sample with sufficiently bright ultraviolet light.

When falling below the lower limit of the conditional expression (2), the refractive index of the image-side lens will become excessively small. In this case, it will be difficult to gradually bend the divergent light beam with a large angle of divergence, incident on the objective, such that it approaches the optical axis. Therefore, the light-ray height of the axial light beam after it has passed through the image-side lens will become high. This leads to occurrence of high order spherical aberration, but it will become difficult to correct this high order spherical aberration with the optical system located closer to the image side than the image-side lens.

Further, in the immersion microscope objective according to the present embodiment, it is preferable that the first lens group includes, in order from the object side, a cemented lens and a single lens, the cemented lens and the single lens each have a positive refractive power, and the following conditional expression (3) is satisfied:

$$2.2 \leq f_{G1p}/f \leq 3.5 \quad (3)$$

where $f_{G1p}$ denotes a composite focal length of the cemented lens and the single lens, and f denotes the focal length of the entire system of the immersion microscope objective.

When the conditional expression (3) is satisfied, the composite refractive power of the cemented lens and the single lens can be set appropriately with respect to the refractive power of the overall objective. This can suppress the divergence of light ray and the occurrence of aberration in a well-balanced manner. As a result, it is possible to gradually bend the divergent light beam with a large angle of divergence, incident on the objective, so as to cause it to approach the optical axis, while suppressing the occurrence of aberration.

When exceeding the upper limit of the conditional expression (3), the composite focal length of the cemented lens and the single lens will become excessively long. In this case, since the composite refractive power of the cemented lens and the single lens becomes excessively small, it will become difficult to gradually bend the divergent light beam incident on the objective, such that it approaches the optical axis. Therefore, the light-ray height of the axial light beam after it has passed through the single lens will become high. This leads to occurrence of high order spherical aberration, but it will become difficult to correct such high order spherical aberration with the optical system located closer to the image side than the single lens.

When falling below the lower limit of the conditional expression (3), the composite focal length of the cemented lens and the single lens will become excessively short. In this case, since the radii of curvature of the lens surfaces of the respective lenses will become excessively small, the spherical aberration will occur. In particular, the radius of curvature at the image-side lens surface (air-contact surface) of the cemented lens will become excessively small, so a large spherical aberration will occur.

Furthermore, since the refractive power of the first lens group will become excessively large, positive Petzval's sum will increase. In this case, it is preferable that an increase of the positive Petzval's sum can be cancelled by a negative Petzval's sum in a lens group located closer to the image side than the first lens group, particularly in the third lens group. However, it will become difficult to secure a sufficient negative Petzval's sum in the third lens group.

Further, in the immersion microscope objective according to the present embodiment, it is preferable that the third lens group satisfies the following conditional expression (4):

$$-3.8 \leq f_{G3}/f \leq -3 \quad (4)$$

where $f_{G3}$ denotes a focal length of the third lens group, and f denotes the focal length of the entire system of the immersion microscope objective.

When the conditional expression (4) is satisfied, the refractive power of the third lens group becomes appropriately large. This makes it possible to properly secure the negative Petzval's sum in the third lens group, it is possible to enhance flatness of a field.

When exceeding the upper limit of the conditional expression (4), the refractive power of the third lens group will become excessively large. Here, the third lens group has been configured to include the object-side lens group and the image-side lens group, and in the object-side lens group, the surface nearest to the image side is the concave surface facing the image side, and in the image-side lens group, the surface nearest to the object side is the concave surface facing the object side. In this case, if the refractive power of the third lens group becomes excessively large, the radius of curvature of the concave surface in the object-side lens group and the radius of curvature of the concave surface in the image-side lens group will both become excessively small. As a result, a large coma will occur.

When falling below the lower limit of the conditional expression (4), it will become difficult to secure a sufficient negative Petzval's sum in the third lens group. Therefore, a large curvature of field will occur. As a result, flatness of a field will deteriorate.

Further, in the immersion microscope objective according to the present embodiment, it is preferable that the second lens group includes at least an object-side lens component, the object-side lens component is disposed nearest to the object side and moves in an optical axis direction, the lens component is a single lens or a cemented lens, and the following conditional expression (5) is satisfied:

$$20 \leq f_{G2o}/f \leq 50 \quad (5)$$

where $f_{G2o}$ denotes a focal length of the object-side lens component, and f denotes the focal length of the entire system of the immersion microscope objective.

Any changes in thickness of the cover glass, type of the immersion liquid, temperature of the specimen or the immersion liquid, or observation position will cause fluctuation in spherical aberration. In such a case, the lens group can be moved in the optical axis direction to correct the spherical aberration. To move the lens group, a correction collar may be rotated.

Thus, in the objective according to the present embodiment, the second lens group is configured to be movable. Here, the second lens group includes at least the object-side lens component, and the object-side lens component is disposed nearest to the object side.

As explained above, while the divergent light beam is converted to a convergent light beam in the first lens group, the divergent light beam is bent gradually. Therefore, the convergent light beam exiting the first lens group enters the second lens group with a moderate angle, in the state where the light-ray height is high. Thus, moving the object-side lens component in the optical axis direction makes it possible to newly produce spherical aberration, while suppressing the fluctuation in aberration other than the spherical aberration.

At this time, when the object-side lens component is moved in an appropriate direction, the spherical aberration can be newly produced in a direction opposite to that of the spherical aberration caused by the above-described changes. Accordingly, the spherical aberration newly produced in an appropriate amount can correct the spherical aberration caused by the above-described changes.

When the conditional expression (5) is satisfied, the spherical aberration caused by the above-described changes can be corrected.

When exceeding the upper limit of the conditional expression (5), the refractive power of the object-side lens component will become excessively small. In this case, the amount of movement of the object-side lens group will increase, but it is difficult to secure a sufficient space for the movement. It is thus difficult to adequately correct the spherical aberration.

When falling below the lower limit of the conditional expression (5), the refractive power of the object-side lens component will become excessively large. In this case, when the object-side lens component is moved, fluctuation in aberration other than the spherical aberration, for example in chromatic aberration, will become large. As a result the optical performance of the objective will deteriorate.

Further, in the immersion microscope objective according to the present embodiment, it is preferable that the first lens group includes a cemented lens made up of three lenses.

With this configuration, it is possible to favorably correct the longitudinal chromatic aberration, while maintaining an appropriate positive refractive power.

A microscope according to the present embodiment includes: a light source; an illumination optical system; a main-body section; an observation optical system; and a microscope objective, wherein the immersion microscope objective described above is used for the microscope objective.

The microscope according to the present embodiment includes the immersion microscope objective which has a large numerical aperture, high magnification, and high flatness of a field, and in which various aberrations have been corrected sufficiently. Accordingly, it is possible to observe a sample and acquire an image with high resolving power.

It should be noted that each of the conditional expressions may be used independently, or may be used freely in combination with any other conditional expressions. In either case, the effects of the present invention are achieved. Further, the upper limit or the lower limit of any conditional expression may be changed independently. The resultant conditional expression will achieve the effects of the present invention similarly.

Examples of the immersion microscope objective according to the present invention will be described in detail below by referring to the accompanying drawings. It should be noted that the present invention is not limited to the following examples.

Figure 2:
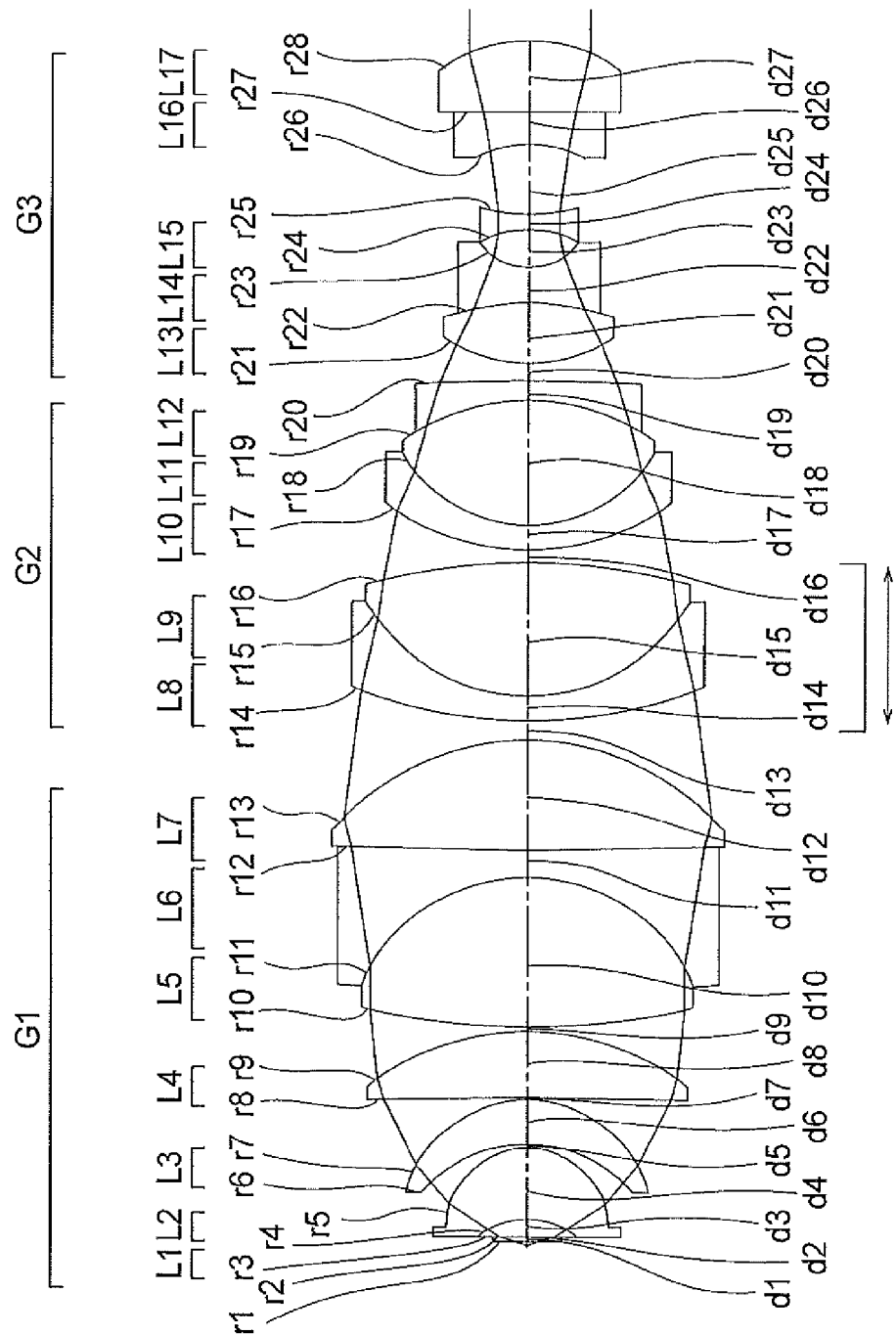
FIG. 2 is a cross-sectional view along an optical axis, showing an optical arrangement of an immersion microscope objective according to an example 2 of the present invention.
Figure 3:
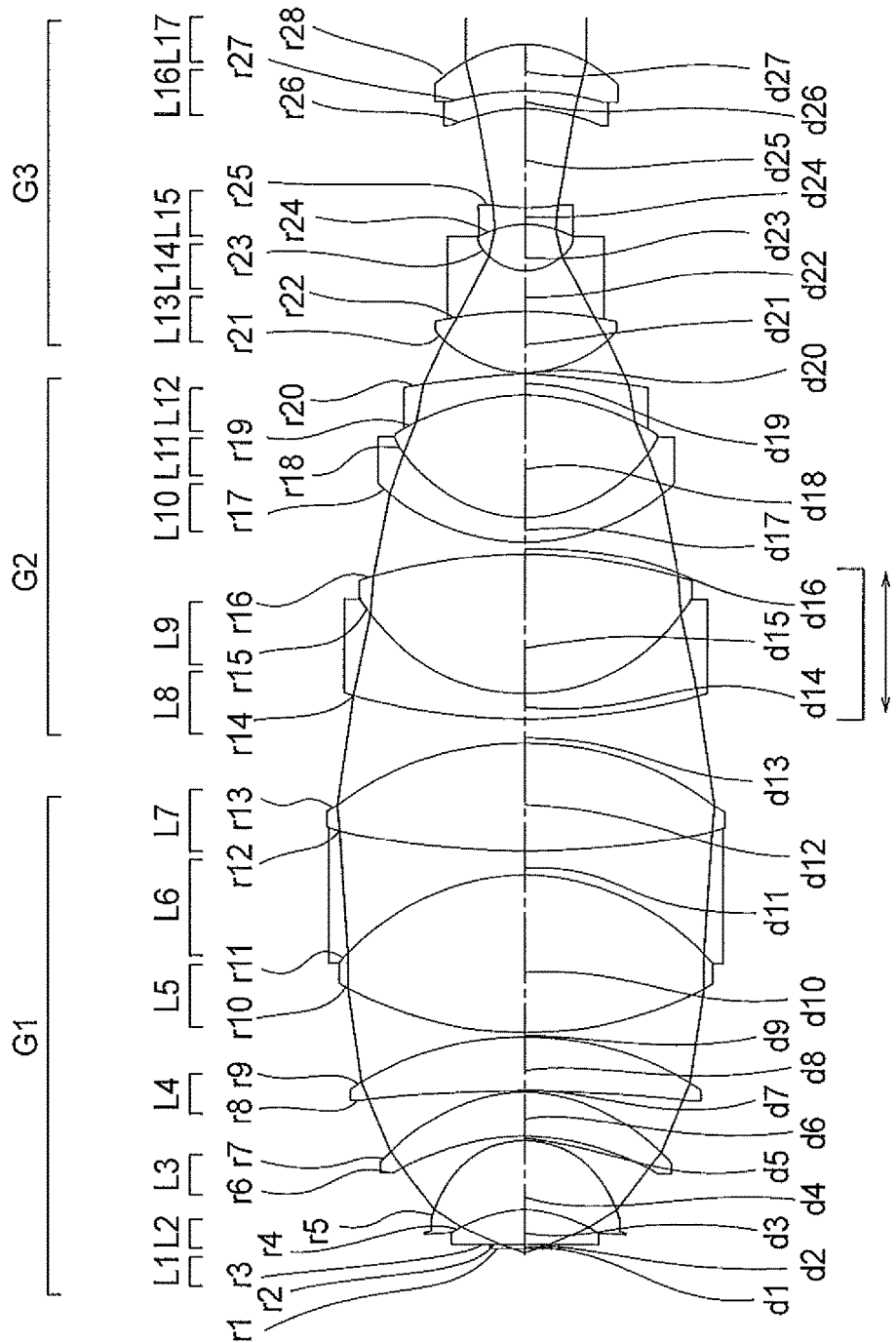
FIG. 3 is a cross-sectional view along an optical axis, showing an optical arrangement of an immersion microscope objective according to an example 3 of the present invention.
Figure 5A:
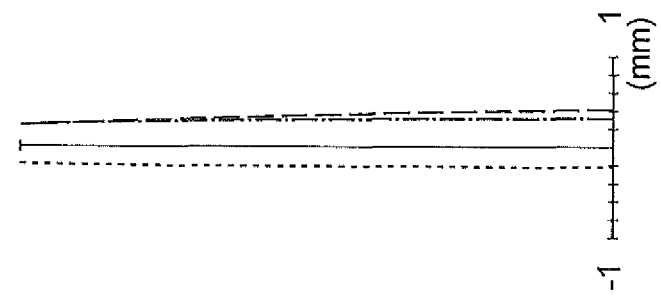
FIGS. 5A, 5B, 5C, and 5D are aberration diagrams of the immersion microscope objective according to the example 2.
Figure 5B:
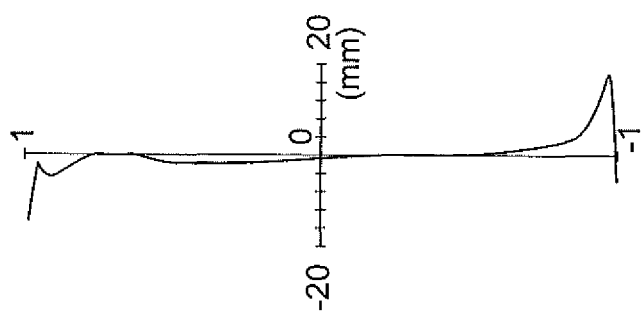
Figure 5C:
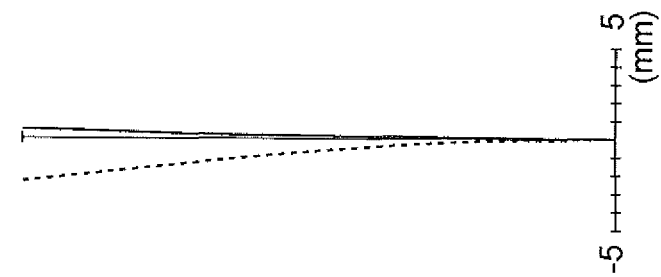
Figure 5D:
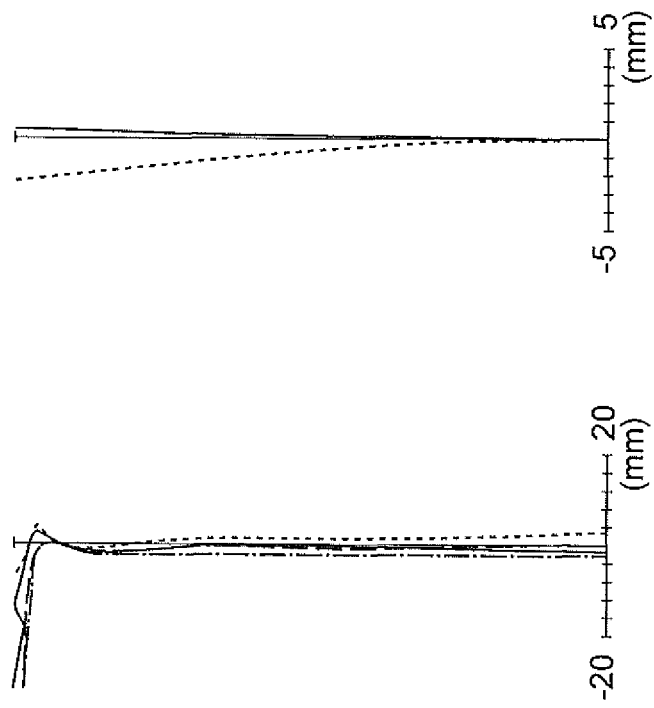
Figure 7:
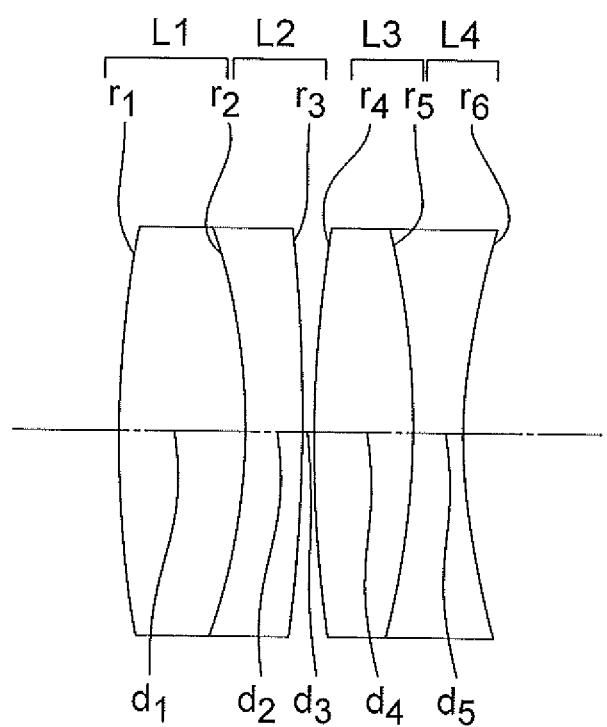
FIG. 7 is a cross-sectional view of a tube lens.

Examples 1 to 3 of the immersion microscope objective according to the present invention will be described below. FIGS. 1 to 3 are cross-sectional views along the optical axes, showing the optical arrangements of the immersion microscope objectives according to the examples 1 to 3, respectively. In the cross-sectional views, reference numerals L1 to L17 denote lenses. FIG. 7 is a cross-sectional view of a tube lens.

The immersion microscope objectives of the examples 1 to 3 are infinity-corrected microscope objectives. In an infinity-corrected microscope objective, light rays exiting the microscope objective are collimated, so an image is not formed in itself. Therefore, the parallel light beam is made to converge by a tube lens as shown in FIG. 7, for example. An image of a sample plane is formed at the position where the parallel light beam converges. In the above description, the image side means the side where the tube lens is disposed.

An objective according to the example 1 will now be described. As shown in FIG. 1, the objective of the example 1 includes, in order from an object side, a first lens group G1, a second lens group G2, and a third lens group G3.

The first lens group G1 has a positive refractive power. The first lens group G1 includes, in order from the object side, a planoconvex positive lens L1, a positive meniscus lens L2 having a convex surface facing an image side, a positive meniscus lens L3 having a convex surface facing the image side, a planoconvex positive lens L4, a biconvex positive lens L5, a negative meniscus lens L6 having a convex surface facing the image side, and a positive meniscus lens L7 having a convex surface facing the image side. Here, the planoconvex positive lens L1 and the positive meniscus lens L2 are cemented together. Further, the biconvex positive lens L5, the negative meniscus lens L6, and the positive meniscus lens L7 are cemented together. It should be noted that the negative meniscus lens L6 and the positive meniscus lens L7 having the convex surface facing the image side may be replaced with a planoconcave negative lens having a concave surface facing the object side and a planoconvex positive lens having a convex surface facing the image side, respectively.

The second lens group G2 has a positive refractive power. The second lens group G2 includes, in order from the object side, a negative meniscus lens L8 having a convex surface facing the object side, a biconvex positive lens L9, a negative meniscus lens L10 having a convex surface facing the object side, a biconvex positive lens L11, and a negative meniscus lens L12 having a convex surface facing the image side. Here, the negative meniscus lens L8 and the biconvex positive lens L9 are cemented together. Further, the negative meniscus lens L10, the biconvex positive lens L11, and the negative meniscus lens L12 are cemented together.

The third lens group G3 has a negative refractive power. The third lens group G3 includes, in order from the object side, a biconvex positive lens L13, a biconcave negative lens L14, a biconcave negative lens L15, a negative meniscus lens L16 having a convex surface facing the image side, and a positive meniscus lens L17 having a convex surface facing the image side. Here, the biconvex positive lens L13 and the biconcave negative lens L14 are cemented together. Further, the negative meniscus lens L16 and the positive meniscus lens L17 are cemented together.

In the first lens group G1 and the third lens group G3, their positions are fixed. In the second lens group G2, the cemented lens of the negative meniscus lens L8 and the biconvex positive lens L9 moves along the optical axis with respect to the other lenses.

Next, an objective according to the example 2 will be described. As shown in FIG. 2, the objective of the example 2 includes, in order from an object side, a first lens group G1, a second lens group G2, and a third lens group G3.

The first lens group G1 has a positive refractive power. The first lens group G1 includes, in order from the object side, a planoconvex positive lens L1, a positive meniscus lens L2 having a convex surface facing an image side, a positive meniscus lens L3 having a convex surface facing the image side, a positive meniscus lens L4 having a convex surface facing the image side, a biconvex positive lens L5, a biconcave negative lens L6, and a biconvex positive lens L7. Here, the planoconvex positive lens L1 and the positive meniscus lens L2 are cemented together. Further, the biconvex positive lens L5, the biconcave negative lens L6, and the biconvex positive lens L7 are cemented together.

The second lens group G2 has a positive refractive power. The second lens group G2 includes, in order from the object side, a negative meniscus lens L8 having a convex surface facing the object side, a biconvex positive lens L9, a negative meniscus lens L10 having a convex surface facing the object side, a biconvex positive lens L11, and a negative meniscus lens L12 having a convex surface facing the image side. Here, the negative meniscus lens L8 and the biconvex positive lens L9 are cemented together. Further, the negative meniscus lens L10, the biconvex positive lens L11, and the negative meniscus lens L12 are cemented together.

The third lens group G3 has a negative refractive power. The third lens group G3 includes, in order from the object side, a biconvex positive lens L13, a biconcave negative lens L14, a biconcave negative lens L15, a biconcave negative lens L16, and a biconvex positive lens L17. Here, the biconvex positive lens L13 and the biconcave negative lens L14 are cemented together. Further, the biconcave negative lens L16 and the biconvex positive lens L17 are cemented together.

In the first lens group G1 and the third lens group G3, their positions are fixed. In the second lens group G2, the cemented lens of the negative meniscus lens L8 and the biconvex positive lens L9 moves along the optical axis with respect to the other lenses.

Next, an objective according to the example 3 will be described. As shown in FIG. 3, the objective of the example 3 includes, in order from an object side, a first lens group G1, a second lens group G2, and a third lens group G3.

The first lens group G1 has a positive refractive power. The first lens group G1 includes, in order from the object side, a planoconvex positive lens L1, a positive meniscus lens L2 having a convex surface facing an image side, a positive meniscus lens L3 having a convex surface facing the image side, a positive meniscus lens L4 having a convex surface facing the image side, a biconvex positive lens L5, a biconcave negative lens L6, and a biconvex positive lens L7. Here, the planoconvex positive lens L1 and the positive meniscus lens L2 are cemented together. Further, the biconvex positive lens L5, the biconcave negative lens L6, and the biconvex positive lens L7 are cemented together.

The second lens group G2 has a positive refractive power. The second lens group G2 includes, in order from the object side, a negative meniscus lens L8 having a convex surface facing the object side, a biconvex positive lens L9, a negative meniscus lens L10 having a convex surface facing the object side, a biconvex positive lens L11, and a negative meniscus lens L12 having a convex surface facing the image side. Here, the negative meniscus lens L8 and the biconvex positive lens L9 are cemented together. Further, the negative meniscus lens L10, the biconvex positive lens L11, and the negative meniscus lens L12 are cemented together.

The third lens group G3 has a negative refractive power. The third lens group G3 includes, in order from the object side, a biconvex positive lens L13, a biconcave negative lens L14, a biconcave negative lens L15, a negative meniscus lens L16 having a convex surface facing the image side, and a positive meniscus lens L17 having a convex surface facing the image side. Here, the biconvex positive lens L13 and the biconcave negative lens L14 are cemented together. Further, the negative meniscus lens L16 and the positive meniscus lens L17 are cemented together.

In the first lens group G1 and the third lens group G3, their positions are fixed. In the second lens group G2, the cemented lens of the negative meniscus lens L8 and the biconvex positive lens L9 moves along the optical axis with respect to the other lenses.

Next, numerical data of optical members forming the objective of the abovementioned examples is given below.

In the numerical data for each example, r denotes a radius of curvature of each lens surface (however, r1 and r2 are virtual surfaces), d denotes a thickness of each lens or an air space (however, d1 denotes a thickness of a cover glass, and d2 denotes a thickness of an immersion liquid layer), nd denotes the refractive index of each lens for a d-line, νd denotes Abbe number for each lens, β denotes magnification, NA denotes the numerical aperture, f denotes a focal length of the overall objective, WD denotes a working distance, and FN denotes a field number. The magnification β is a magnification when combined with a tube lens that will be described later (focal length 180 mm). Further, WD denotes the distance when the cover glass has a thickness of 0.17 mm. The field number is 22 mm.

Numerical data in each example show data in the state where there is a cover glass between a sample and the objective. In this state, an image of the sample is formed via the cover glass and the immersion liquid. In this case, the virtual surface r1 indicates a boundary between the sample plane and the cover glass, and the virtual surface r2 indicates a boundary between the cover glass and the immersion liquid. As the immersion liquid and the biological specimen have their refractive indices close to each other, in the state where the distance between the cover glass and the objective is smaller than the value of d2, the fluorescent light caused by the light ray from the sample plane, that had reached the interior of the specimen from the virtual surface r1, enters the objective with few aberrations. It is thus evident that the interior of the sample can be observed. The radius of curvature r, the surface separation d, the focal length f, and the working distance WD are all shown in millimeters (mm).

Example 1

| B = −100, NA = 1.35, f = 1.8, WD = 0.217, FN = 22 | | | |
|---|---|---|---|
| Surface data | | | |
| Surface no. | r | d | nd | νd |
| 1 | ∞ | d1 | 1.52100 | 56.02 |
| 2 | ∞ | d2 | 1.40409 | 51.90 |
| 3 | ∞ | 1.0038 | 1.45852 | 67.83 |
| 4 | −3.8000 | 2.9493 | 1.88300 | 40.76 |
| 5 | −3.4688 | 0.1500 | | |
| 6 | −6.6855 | 1.7804 | 1.75500 | 52.32 |
| 7 | −5.7540 | 0.1510 | | |
| 8 | ∞ | 2.5350 | 1.59522 | 67.74 |
| 9 | −12.3287 | 0.1672 | | |
| 10 | 27.4440 | 6.1576 | 1.43875 | 94.93 |
| 11 | −7.9036 | 1.1500 | 1.63775 | 42.41 |
| 12 | −2553.4402 | 3.9799 | 1.43875 | 94.93 |
| 13 | −10.9049 | d13 | | |
| 14 | 33.7194 | 1.1000 | 1.63775 | 42.41 |
| 15 | 7.8248 | 5.5131 | 1.43875 | 94.93 |
| 16 | −19.3175 | d16 | | |
| 17 | 9.6846 | 1.0000 | 1.63775 | 42.41 |
| 18 | 5.9012 | 4.9087 | 1.43875 | 94.93 |
| 19 | −9.4714 | 0.8000 | 1.61336 | 44.49 |
| 20 | −24.9286 | 0.4775 | | |
| 21 | 5.1797 | 2.5301 | 1.49700 | 81.54 |
| 22 | −21.3115 | 1.5338 | 1.63775 | 42.41 |
| 23 | 2.3963 | 1.6836 | | |
| 24 | −3.9461 | 0.7000 | 1.77250 | 49.60 |
| 25 | 8.8980 | 7.3400 | | |
| 26 | −5.9356 | 1.1550 | 1.61336 | 44.49 |
| 27 | −60.4766 | 2.3410 | 1.73800 | 32.26 |
| 28 | −5.7630 | | | |

| B = −100, NA = 1.35, f = 1.8, WD = 0.217, FN = 22 | | | |
|---|---|---|---|
| Various data | | | |
| d1 | 0.13 | 0.17 | 0.19 |
| d2 | 0.2446 | 0.2170 | 0.2036 |
| d13 | 0.4373 | 0.9473 | 1.2273 |
| d16 | 1.0288 | 0.5188 | 0.2388 |

Example 2

| B = −100, NA = 1.35, f = 1.8, WD = 0.217, FN = 22 | | | |
|---|---|---|---|
| Surface data | | | |
| Surface no. | r | d | nd | νd |
| 1 | ∞ | d1 | 1.52100 | 56.02 |
| 2 | ∞ | d2 | 1.40409 | 51.90 |
| 3 | ∞ | 0.7101 | 1.45852 | 67.83 |
| 4 | −3.3200 | 2.9351 | 1.88300 | 40.76 |
| 5 | −3.2933 | 0.1500 | | |
| 6 | −5.5538 | 1.7838 | 1.74100 | 52.64 |
| 7 | −5.0869 | 0.1500 | | |
| 8 | −146.1257 | 2.6771 | 1.59522 | 67.74 |
| 9 | −10.7389 | 0.1500 | | |
| 10 | 29.5466 | 6.1582 | 1.43875 | 94.93 |
| 11 | −7.4591 | 1.1000 | 1.63775 | 42.41 |
| 12 | 175.8765 | 4.4572 | 1.43875 | 94.93 |
| 13 | −10.4332 | d13 | | |
| 14 | 19.2142 | 1.0000 | 1.63775 | 42.41 |
| 15 | 7.4207 | 5.4946 | 1.43875 | 94.93 |
| 16 | −25.8615 | d16 | | |
| 17 | 9.5298 | 1.0000 | 1.63775 | 42.41 |
| 18 | 5.7485 | 5.1463 | 1.43875 | 94.93 |
| 19 | −8.4216 | 0.8000 | 1.51633 | 64.14 |
| 20 | −61.9312 | 0.6936 | | |
| 21 | 6.4042 | 2.4908 | 1.49700 | 81.54 |
| 22 | −9.2067 | 1.4271 | 1.63775 | 42.41 |
| 23 | 2.5854 | 1.5639 | | |
| 24 | −3.9518 | 0.6391 | 1.61340 | 44.27 |
| 25 | 8.2481 | 2.8414 | | |
| 26 | −5.2486 | 1.3103 | 1.61336 | 44.49 |
| 27 | 146.0111 | 2.9850 | 1.73800 | 32.26 |
| 28 | −5.9005 | | | |

| B = −100, NA = 1.35, f = 1.8, WD = 0.217, FN = 22 | | | |
|---|---|---|---|
| Various data | | | |
| d1 | 0.13 | 0.17 | 0.19 |
| d2 | 0.2407 | 0.2170 | 0.2056 |
| d13 | 0.3410 | 0.8110 | 1.0610 |
| d16 | 0.9678 | 0.4978 | 0.2478 |

Example 3

| B = −100, NA = 1.35, f = 1.8, WD = 0.203, FN = 22 | | | |
|---|---|---|---|
| Surface data | | | |
| Surface no. | r | d | nd | νd |
| 1 | ∞ | d1 | 1.52100 | 56.02 |
| 2 | ∞ | d2 | 1.40409 | 51.90 |
| 3 | ∞ | 1.4260 | 1.45852 | 67.83 |
| 4 | −5.5000 | 2.8477 | 1.88300 | 40.76 |
| 5 | −3.8145 | 0.1500 | | |
| 6 | −10.3682 | 1.7892 | 1.75500 | 52.32 |
| 7 | −7.3992 | 0.1500 | | |
| 8 | −59.0521 | 2.1781 | 1.59522 | 67.74 |
| 9 | −12.8963 | 0.1700 | | |

-continued

B = −100, NA = 1.35, f = 1.8, WD = 0.203, FN = 22

| | | | | |
|---|---|---|---|---|
| 10 | 15.3806 | 6.3765 | 1.43875 | 94.93 |
| 11 | −9.7346 | 1.0000 | 1.63775 | 42.41 |
| 12 | 33.0053 | 4.4661 | 1.43875 | 94.93 |
| 13 | −12.7945 | d13 | | |
| 14 | 27.8369 | 1.0010 | 1.63775 | 42.41 |
| 15 | 7.6694 | 5.7350 | 1.43875 | 94.93 |
| 16 | −22.6935 | d16 | | |
| 17 | 9.0865 | 1.0000 | 1.63775 | 42.41 |
| 18 | 5.9431 | 4.9670 | 1.43875 | 94.93 |
| 19 | −9.4171 | 0.8000 | 1.61336 | 44.49 |
| 20 | −24.6607 | 0.1064 | | |
| 21 | 4.6890 | 2.5288 | 1.49700 | 81.54 |
| 22 | −15.3963 | 1.6444 | 1.63775 | 42.41 |
| 23 | 2.0303 | 1.9348 | | |
| 24 | −3.1219 | 0.7000 | 1.77250 | 49.60 |
| 25 | 15.1148 | 4.0078 | | |
| 26 | −6.6909 | 0.7233 | 1.61336 | 44.49 |
| 27 | −11.9643 | 1.8568 | 1.73800 | 32.26 |
| 28 | −5.1821 | | | |

Various data

| | | | |
|---|---|---|---|
| d1 | 0.13 | 0.17 | 0.19 |
| d2 | 0.2321 | 0.2030 | 0.1884 |
| d13 | 0.4197 | 0.9297 | 1.1797 |
| d16 | 1.0495 | 0.5395 | 0.2895 |

Tube lens

Surface data

| Surface no. | r | d | nd | vd |
|---|---|---|---|---|
| 1 | 68.7541 | 7.7321 | 1.48749 | 70.23 |
| 2 | −37.5679 | 3.4742 | 1.80610 | 40.92 |
| 3 | −102.8477 | 0.6973 | | |
| 4 | 84.3099 | 6.0238 | 1.83400 | 37.16 |
| 5 | −50.7100 | 3.0298 | 1.64450 | 40.82 |
| 6 | 40.6619 | | | |

| focal length | 180 |
|---|---|

FIGS. 4A, 4B, 4C, and 4D to FIGS. 6A, 6B, 6C, and 6D are aberration diagrams of the objectives according to the examples 1 to 3. The aberration diagrams of each example show the aberrations in the case where the distance between the immersion microscope objective and the tube lens is 120 mm. FIGS. 4A, 5A, and 6A each show spherical aberration (SA), FIGS. 4B, 5B, and 6B each show astigmatism (AS), FIGS. 4C, 5C, and 6C each show coma (DZY), and FIGS. 4D, 5D, and 6D each show chromatic aberration of magnification (CC). Further, "IMH" shows an image height.

Next, the values of conditional expressions (1) to (5) in each example are shown below.

| Conditional expressions | Example1 | Example2 | Example3 |
|---|---|---|---|
| (1) $(r_{G12}/f) \times (NA_{ob}/nd_{imm})^2$ | −1.95 | −1.71 | −2.81 |
| (2) $nd_{G1i} - nd_{G1o}$ | 0.42 | 0.42 | 0.42 |
| (3) $f_{G1p}/f$ | 2.77 | 2.74 | 2.74 |
| (4) $f_{G3}/f$ | −3.5 | −3.51 | −3.43 |
| (5) $f_{G2o}/f$ | 33.13 | 24.06 | 33.48 |

Figure 8:
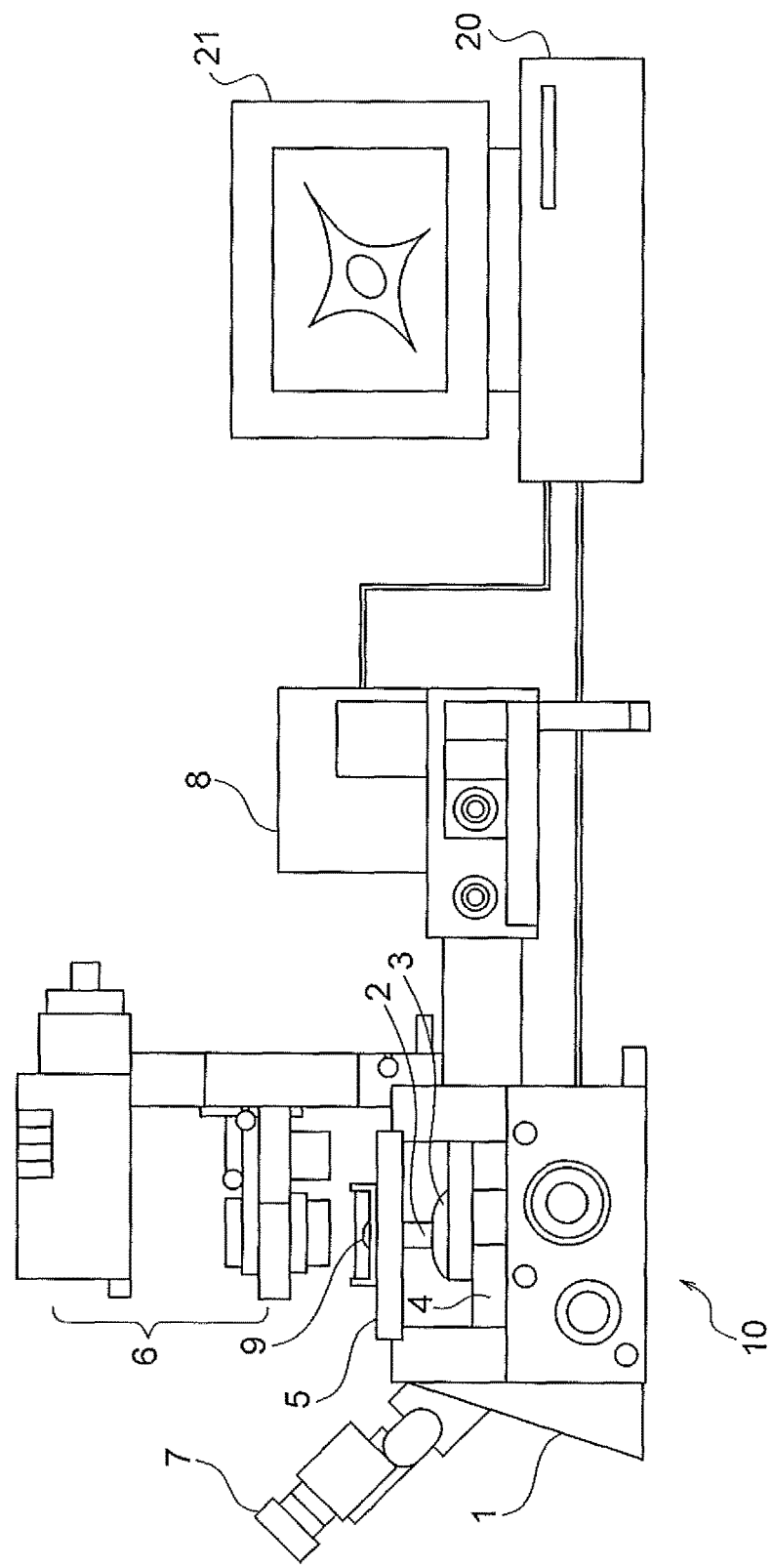
FIG. 8 is a diagram of a microscope having the immersion microscope objective of the present invention used therein.

FIG. 8 is a diagram showing the microscope according to the present embodiment. In FIG. 8, an example of an external structure of a laser scanning microscope is shown as an example of the microscope. As shown in FIG. 8, a microscope 10 includes a main body section 1, an objective 2, a revolver 3, an objective raising and lowering mechanism 4, a stage 5, an epi-illumination unit 6, an observation lens barrel 7, and a scanner 8. Moreover, an image processing apparatus 20 is connected to the microscope 10, and an image display apparatus 21 is connected to the image processing apparatus 20. In the microscope according to the present embodiment, the immersion microscope objective according to the present embodiment is used for the objective 2.

The stage 5 is provided to the main body section 1. A sample 9 is to be placed on the stage 5. Moreover, the epi-illumination unit 6 is provided at an upper side of the main body section 1. Epi-illumination visible light is irradiated to the sample 9 by the epi-illumination unit 6. Light from the sample 9 travels through the objective 2, and reaches the observation lens barrel 7. A user is able to observe the sample 9 through the observation lens barrel 7 in visible light.

Moreover, a laser source (not shown in the diagram) and the scanner 8 are provided at a rear side (right side of a paper surface) of the main body section 1. The laser source and the scanner 8 are connected by a fiber (not shown in the diagram). The scanner 8 includes a galvanometer scanner and a photo detection element, which are disposed at an interior of the scanner 8. The laser source is a laser which generates an infrared light that can operate two-photon excitation. Light from the laser source, after travelling through the scanner 8 is incident on the objective 2. The objective 2 is positioned at a lower side of the stage 5. Therefore, the sample 9 is illuminated from a lower side as well.

Light (reflected light or fluorescent light) from the sample 9, upon travelling through the objective 2, passes through the scanner 8, and is detected by the photo detection element. In the two-photon excitation, since fluorescent light generates only focal point, a confocal observation is possible. In the confocal observation, it is possible to obtain a cross-sectional image of the sample 9.

The objective raising and lowering mechanism 4 is connected to the revolver 3. The objective raising and lowering mechanism 4 is capable of moving the objective 2 (the revolver 3) along an optical axial direction. In a case in which, a plurality of cross-sectional images along the optical axial direction of the sample 9 are to be obtained, the objective 2 is to be moved by the objective raising and lowering mechanism 4.

A signal obtained by the photo detection element is transmitted to the image processing apparatus 20. An image processing is carried out in the image processing apparatus 20, and an image of the sample 9 is displayed on the image display apparatus 21.

In the example described above, the immersion microscope objective according to the present embodiment has been used for the two-photon excitation observation. However, it is also possible to use the immersion microscope objective according to the present embodiment for a total internal reflection fluorescence observation. In such case, a diameter of a bundle of rays from the laser source is to be kept smaller than an effective aperture of the immersion microscope objective. Moreover, an arrangement is to be made such that, the bundle of rays from the laser source is made to be incident on the immersion microscope objective such that it does not include an optical axis of the immersion microscope objective.

Further, the immersion microscope objective of the present embodiment may be used for a conventional microscope using a xenon lamp or halogen lamp.

It should be noted that in the examples 1 to 3, silicone having the refractive index of 1.40409 for the d-line was used as the immersion liquid. Alternatively, an immersion liquid as a mixture of glycerin and water, having a similar refractive index, may be used. Furthermore, various modifications can be made to the present invention without departing from the scope thereof.

According to the present invention, it is possible to provide an immersion microscope objective which has a large numerical aperture, high magnification, and high flatness of a field, and in which various aberrations have been corrected sufficiently, and also provide a microscope using the immersion microscope objective.

As described above, the present invention is suitably applicable to an immersion microscope objective which has a large numerical aperture, high magnification, and high flatness of a field, and in which various aberrations have been corrected sufficiently, and to a microscope using the immersion microscope objective.

What is claimed is:

1. An immersion microscope objective comprising, in order from an object side:
   a first lens group having a positive refractive power;
   a second lens group having a positive refractive power; and
   a third lens group having a negative refractive power;
   wherein:
   the first lens group includes, in order from the object side, a cemented lens and a single lens,
   the cemented lens and the single lens each have a positive refractive power, and
   the following conditional expression (3') is satisfied:

$$2.74 \leq f_{G1p}/f \leq 3.5 \quad (3')$$

where:
$f_{G1p}$ denotes a composite focal length of the cemented lens and the single lens, and
f denotes a focal length of an entire system of the immersion microscope objective.

2. The immersion microscope objective according to claim 1, wherein:
   the first lens group converts a divergent light beam to a convergent light beam,
   the third lens group includes an object-side lens component and an image-side lens component,
   the object-side lens component is disposed nearest to the object side, and the image-side lens component is disposed closer to the image side than the object-side lens component,
   the object-side lens component has a meniscus shape with a concave surface facing the image side,
   the image-side lens component has a meniscus shape with a concave surface facing the object side, and
   each of the object-side lens component and the image-side lens component is a cemented lens.

3. The immersion microscope objective according to claim 1, wherein:
   the first lens group includes a first cemented lens disposed nearest to the object side,
   the first cemented lens includes an object-side lens and an image-side lens, and the following conditional expression (2) is satisfied:

$$0.3 \leq nd_{G1i} - nd_{G1o} \leq 0.5 \quad (2)$$

where:
$nd_{G1i}$ denotes a refractive index of the image-side lens for a d-line, and
$nd_{G1o}$ denotes a refractive index of the object-side lens for the d-line.

4. The immersion microscope objective according to claim 1, wherein the third lens group satisfies the following conditional expression (4'):

$$-3.51 \leq f_{G3}/f \leq -3 \quad (4')$$

where:
$f_{G3}$ denotes a focal length of the third lens group, and
f denotes the focal length of the entire system of the immersion microscope objective.

5. The immersion microscope objective according to claim 1, wherein:
   the second lens group includes at least an object-side lens component,
   the object-side lens component is disposed nearest to the object side and moves in an optical axis direction,
   the lens component is a single lens or a cemented lens, and the following conditional expression (5) is satisfied:

$$20 \leq f_{G2o}/f \leq 50 \quad (5)$$

where:
$f_{G2o}$ denotes a focal length of the object-side lens component, and
f denotes the focal length of the entire system of the immersion microscope objective.

6. The immersion microscope objective according to claim 1, wherein the first lens group includes a cemented lens made up of three lenses.

7. A microscope comprising:
   a light source;
   an illumination optical system;
   a main-body section;
   an observation optical system; and
   the immersion microscope objective according to claim 1.

8. An immersion microscope objective comprising, in order from an object side:
   a first lens group having a positive refractive power;
   a second lens group having a positive refractive power; and
   a third lens group having a negative refractive power;
   wherein:
   an immersion liquid is provided between the immersion microscope objective and a specimen,
   the first lens group includes a first lens surface and a second lens surface,
   the first lens surface is positioned nearest to the object side, and the second lens surface is positioned on an image side of the first lens surface and nearest to the first lens surface,
   the first lens group includes, in order from the object side, a cemented lens and a single lens,
   the cemented lens and the single lens each have a positive refractive power, and
   the following conditional expressions (1') and (3') are satisfied:

$$-3 \leq (r_{G12}/f) \times (NA_{ob}/nd_{imm})^2 \leq -1.71 \quad (1')$$

$$2.74 \leq f_{G1p}/f \leq 3.5 \quad (3')$$

where:
$r_{G12}$ denotes a radius of curvature at the second lens surface,
f denotes a focal length of an entire system of the immersion microscope objective,
$NA_{ob}$ denotes an object-side numerical aperture of the immersion microscope objective,
$nd_{imm}$ denotes a refractive index of the immersion liquid for a d-line, and $f_{G1p}$ denotes a composite focal length of the cemented lens and the single lens.

9. An immersion microscope objective comprising, in order from an object side:
a first lens group having a positive refractive power;
a second lens group having a positive refractive power; and
a third lens group having a negative refractive power;
wherein:
the third lens group satisfies the following conditional expression (4'):

$$-3.51 \leq f_{G3}/f \leq -3 \quad (4')$$

where:
$f_{G3}$ denotes a focal length of the third lens group, and
f denotes a focal length of an entire system of the immersion microscope objective.

10. The immersion microscope objective according to claim 9, wherein:
the first lens group converts a divergent light beam to a convergent light beam,
the third lens group includes an object-side lens component and an image-side lens component,
the object-side lens component is disposed nearest to the object side, and the image-side lens component is disposed closer to the image side than the object-side lens component,
the object-side lens component has a meniscus shape with a concave surface facing the image side,
the image-side lens component has a meniscus shape with a concave surface facing the object side, and
each of the object-side lens component and the image-side lens component is a cemented lens.

11. The immersion microscope objective according to claim 9, wherein:
the first lens group includes a first cemented lens disposed nearest to the object side,
the first cemented lens includes an object-side lens and an image-side lens, and
the following conditional expression (2) is satisfied:

$$0.3 \leq nd_{G1i} - nd_{G1o} \leq 0.5 \quad (2)$$

where:
$nd_{G1i}$ denotes a refractive index of the image-side lens for a d-line, and
$nd_{G1o}$ denotes a refractive index of the object-side lens for the d-line.

12. The immersion microscope objective according to claim 9, wherein:
the first lens group includes, in order from the object side, a cemented lens and a single lens,
the cemented lens and the single lens each have a positive refractive power, and
the following conditional expression (3') is satisfied:

$$2.74 \leq f_{G1p}/f \leq 3.5 \quad (3')$$

where:
$f_{G1p}$ denotes a composite focal length of the cemented lens and the single lens, and
f denotes the focal length of the entire system of the immersion microscope objective.

* * * * *